Nov. 25, 1969    J. K. GESSLER    3,480,754
RESISTANCE WELDING

Filed Feb. 3, 1967    3 Sheets-Sheet 1

Nov. 25, 1969    J. K. GESSLER    3,480,754
RESISTANCE WELDING

Filed Feb. 3, 1967    3 Sheets-Sheet 3

Inventor:
Jan Klaus Gessler

United States Patent Office 3,480,754
Patented Nov. 25, 1969

3,480,754
RESISTANCE WELDING
Jan Klaus Gessler, Doncaster, England, assignor to British Ropes Limited, Doncaster, Yorkshire, England, a British company
Filed Feb. 3, 1967, Ser. No. 613,879
Int. Cl. B23k 11/02, 11/04
U.S. Cl. 219—57      8 Claims

ABSTRACT OF THE DISCLOSURE

A process and apparatus for resistance butt welding of workpieces such as wires wherein provision is made for varying the pressure between the workpieces when a forging temperature has been reached so as to provide an adequate forging pressure which differs from the contact pressure during the heating stage.

---

Figure 1:
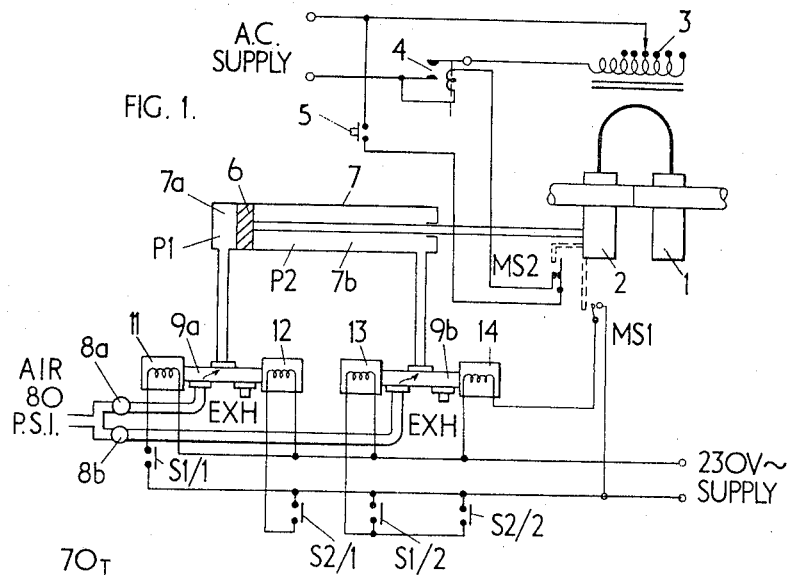

This invention relates to electrical resistance welding, and more particularly to resistance butt welding, e.g. for joining wires end to end.

In the initial stages of such a process the pressure between the workpieces must not be too high or the electrical resistance of the interface falls, resulting in an undesirably long heating time of the interface and an undesirable distribution of heat. With carbon steels the long heating time will lead to excessive decarburization and an unsatisfactory weld.

After forging temperature has been reached, the apparatus should provide the requisite forging pressure between the faces of the workpieces. Normally this forging pressure is greater than the contact pressure required.

In respect of small machines designed for the wire industry, the conventional practice is to provide both pressure stages by means of a single spring, so that an optimum relationship between the pressure phases cannot be achieved. Furthermore, particularly, in larger wire sizes, e.g. above about ⅜ inch diameter, sufficiently high forging forces and consistency in welding are difficult to obtain.

Accordingly, the invention consists in a process for resistance butt welding comprising passing a welding current between butted workpieces subjected to pressure and varying the pressure between the workpieces during the welding cycle to provide a forging pressure different from the contact pressure during the heating stage.

The invention further consists in apparatus for resistance butt welding comprising means for supporting workpieces such that pressure is applied between them, and means for varying the pressure applied during the welding cycle to provide a forging pressure different from the contact pressure during the heating stage.

In one preferred embodiment of the invention, a differential pneumatic cylinder is used. The cubic spaces or chambers which exist at either side of the piston, within the cylinder, are initially supplied with compressed air at different pressures so that the contact pressure for resistant heating is the difference between the pressures acting in the two sections of the cylinder. When the interface has reached the required temperature, or at the selected instant during forging, one portion of the cylinder is exhausted so that the contact pressure is increased for forging. This eliminates the problem of insufficient upset pressure commonly found with conventional resistance welding or larger diameter wires.

In addition, the evacuation of air from one portion or chamber of the cylinder may be regulated to produce a controlled, low contact, pressure during heating. Similar control arrangements can also be made to regulate the flow of air by means of a regulator valve to produce a relatively slow action for part or the whole of the forging period, which ensures a more certain squeezing out of oxide-contaminated material.

The exhausting or evacuation of air, and consequent reduction in pressure from one chamber of the cylinder may be initiated by means of a microswitch which operates after the moving jaw has travelled a short distance, say 1 mm. This reduction of air pressure may also be controlled by utilising known devices to measure pressure between the forging faces which falls when the material has been softened. Alternatively, the temperature may be measured by means of a photo-electric or other temperature sensitive device incorporated in the welding machine, and the exhaust initiated by this.

In some instances, particularly on larger diameters and with some materials, it may be advantageous to have two forging pressures; one producing relatively slow movement in order to squeeze out oxides, and, in the case of carbon steels decarburized material, and a second faster movement to complete forging. This can be accomplished by removing or by-passing the exhaust regulator valve. One method is to open a large exhaust port by means of an electrical control which may be actuated either according to the distance travelled by the moving platen or by the forging time. Instead of a step-like increase in forging force, it is often advantageous to obtain a gradual increase.

With larger diameter wires in particular it may be desirable to control the duration of the welding current independently of the travel of the moving jaw. This may be accomplished by opening the contactor controlling the welding current by means of a timer which is initiated by operation of the microswitch or the pressure or temperature sensitive devices mentioned above.

Alternatively, the timer may measure a time interval from the initiation of the second forging movement.

The invention will be further described with reference to the accompanying drawings.

Figure 2:
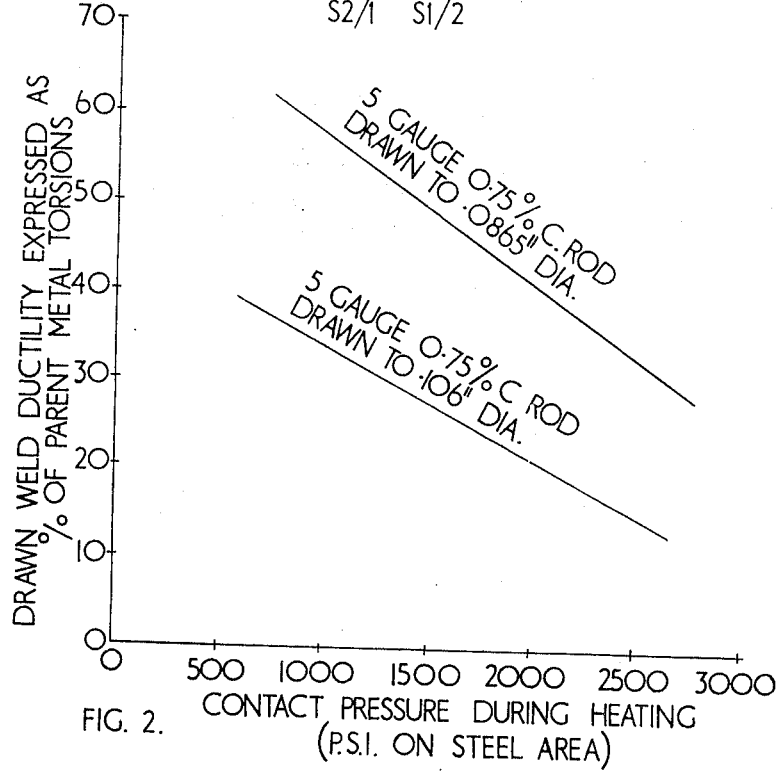
Figure 3:
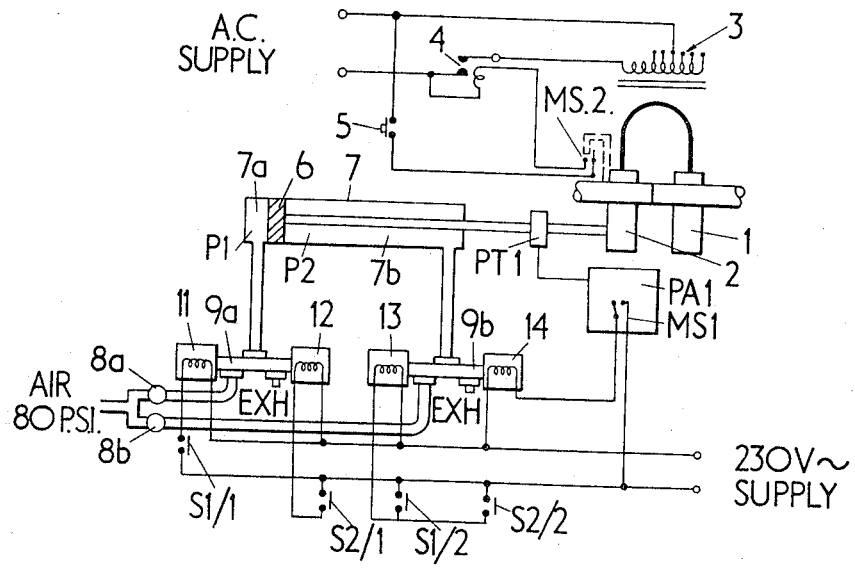
Figure 4:
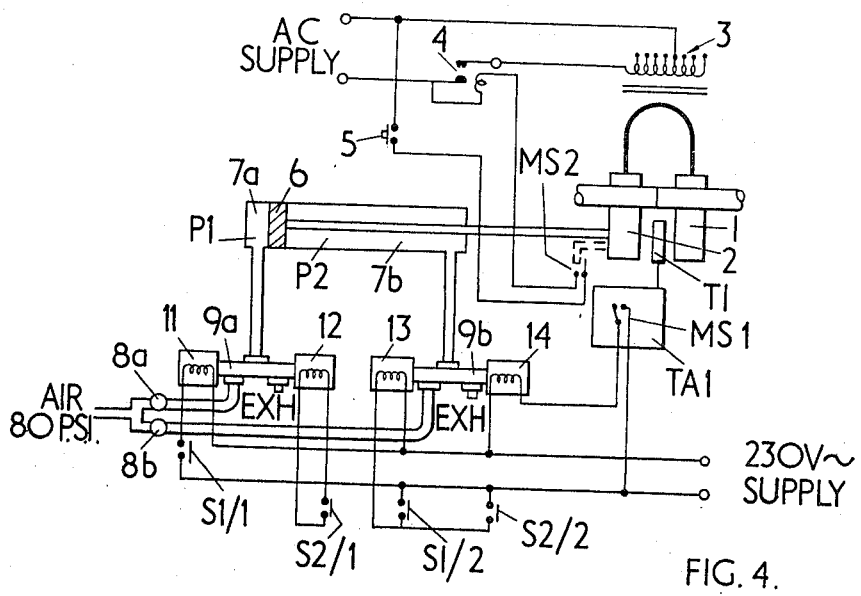
Figure 5:
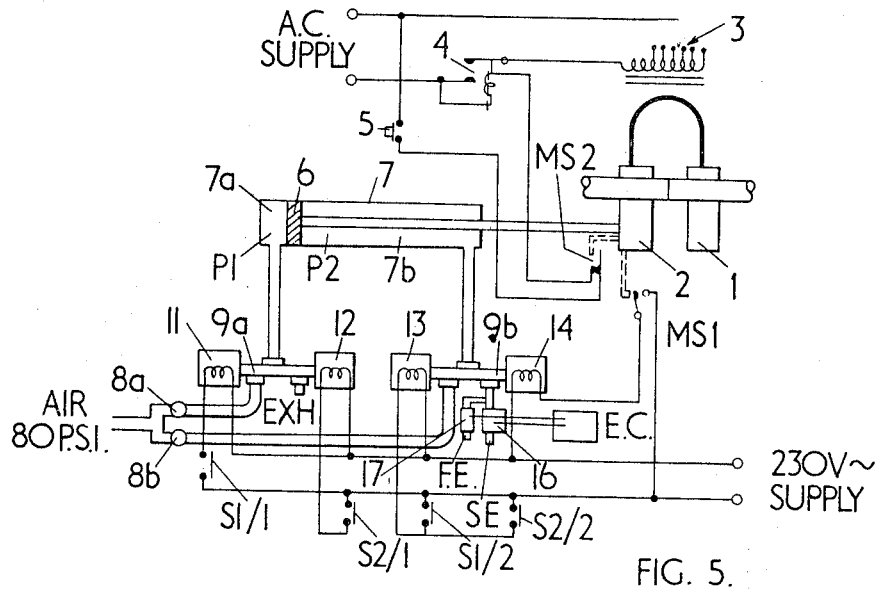
Figure 6:
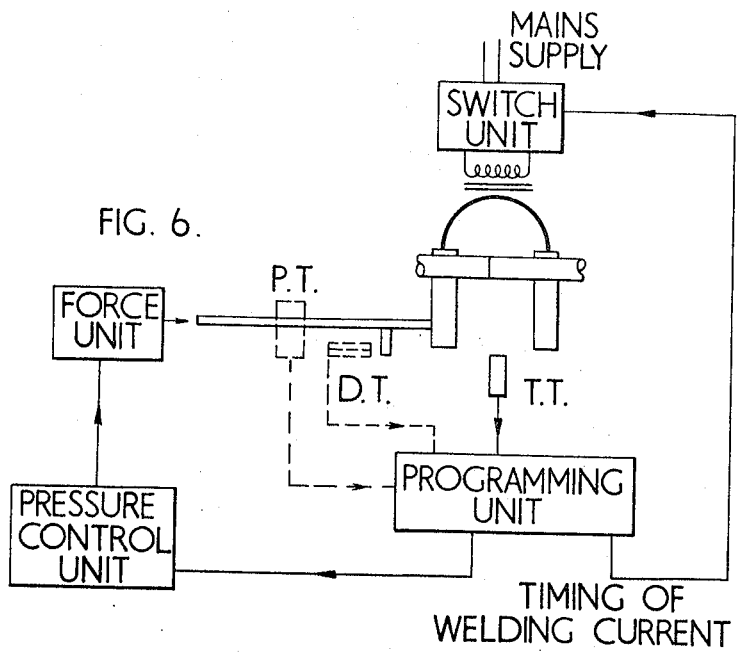

In the drawings:
FIGURE 1 is a schematic diagram of apparatus, consisting a preferred embodiment of the invention for resistance welding;
FIGURE 2 is a graphical representation of the effect of contact pressure during heating on the ductility of the drawn weld;
FIGURES 3 to 5 are diagrams, similar to FIGURE 1 of alternative control devices; and
FIGURE 6 illustrates generaly low control of the welding may be achieved.

Referring first to FIGURE 1, there is shown a stationary electrode jaw 1 and a movable electrode jaw 2, connected in the secondary circuit of a welding transformer 3. The primary of the transformer 3 is energised from a, say 400 v. alternating supply via a contactor 4. The contactor 4 is itself energised from the same supply via a manually controlled weld button 5 and a microswitch MS2 spring loaded to closed position and adapted to be opened by closing movement of the movable jaw 2.

The movable jaw 2 is connected to a piston 6 in a differential air cylinder 7 having air chambers 7a and 7b. Compressed air is admitted to the chambers 7a and 7b from a source via reducing valves 8a and 8b, producing pressures P1 and P2, with P1 greater than P2. Solenoid operated valves 9a and 9b are each adapted to connect the respective chambers to the air supply or to exhaust. The control is by four solenoids 11, 12, 13 and 14, energised from a 230 v. alternating supply. The solenoid 11 is controlled by a first contact S1/1 of a push button switch S1. The solenoid 12 is controlled by a first contact S2/1 of a push button switch S2. The solenoid 13 is controlled by a second contact S1/2 and S2/2 of switches S1 and S2 and is controlled by a microswitch MS1, which is normally open but closable by closing movement of the jaw 2. Depression of either push button switch S1 or S2 releases the other.

In operation, the push button switch S1 and weld button 5 are depressed so that air is admitted to both chambers 7a and 7b, and the contactor 4 is closed. The pressure differential between the chambers 7a or 7b supplies contact pressure while welding current is passed. As the wires to be welded soften, the movable jaw 2 moves and the microswitches MS2 and MS1 operate to shut off welding current and to exhaust chamber 7b, respectively. Thus the forging condition is achieved automatically. After forging, the forging pressure may be released and the movable electrode 2 returned to the original position by depressing pushbutton S2 to exhaust chamber 7a and pressurise chamber 7b.

Using such apparatus, the butt contact pressure during heating becomes a variable capable of independent control. This is important since it appears to determine the ductility of the finished weld.

When the metal collapses, the pressure falls, and part of the forging takes place at low pressure. The action of the switch MS2 then causes one side of the cylinder to be exhausted; the pressure rises at a rate determined primarily, by the regulator valve setting the forging blow. The ratio of low pressure time to high pressure forging time is determined by the current cut off and limit switch setting.

The joint is partly formed as in an orthodox resistance weld, but since the final forging force is greater, problems due to low upset pressure which are met in orthodox resistance welding of heavy rod do not arise.

Drawn welds made in this manner can be much more ductile than conventionally made welds. This is shown in FIGURE 2, which gives the torsions obtained with such welds made in 0.212 inch diameter 0.75% C. patented rod and subsequently drawn at normal production speeds. Different heating pressures were used, but the same final forging force. The graphs indicate a relationship between the heating conditions before forging and ductility—the lower the pressure during heating, the greater the ductility.

This effect does not appear to have been previously recognised. It may be connected with the temperature distribution prior to forging.

The upper graph relates to a final diameter of 0.0865 inch; the lower graph gives the results obtained by drawing the same rod to a greater reduction in area. Both show the same trend and indicate that drawn two-stage resistance welds made with low butt pressure during heating have double the torsions of production welds.

Incidentally, this graph also demonstrates how a controlled amount of cold work, applied in this instance by drawing through a die, improves the ductility of the weld compared with unwelded wire.

The mechanical properties of a series of such welds, which were lead-patented before drawing, have been investigated, and the results compare favourably with welds made by other methods.

Increasing the forging force increases the tensile strength of the drawn weld, but reduces the ductility, since forging pressures are nearing flash welding conditions with more grain disturbance. A series of such welds made from 0.212 inch diameter 0.75% C. rod had approximately the same tensile breaking load as the parent metal. After drawing without subsequent patenting to 0.136 inch diameter, the ultimate tensile strength of the welds was 94 to 97% of that of the parent material.

Resistive heating prevents the formation of craters in the faces of the butted ends with a consequent unsoundness in the completed weld; such crater formation is inherent in flash welding and requires the use of the very high forging forces characteristic of this method. Such high forging forces disturb grain flow and reduce the ductility of the weld. By separate control of contact pressure during heating and final forging force, the latter can utilise an intermediate pressure range between resistance (e.g. 200 p.s.i.) and flash welding (e.g. 8,000 to 30,000 p.s.i.).

The method appears to be particularly suitable for the manufacture of wires for locked coil and other ropes where ductility and flexibility are important requirements. It may permit wire mills to increase the number of welds which can remain in the finished product.

The machine is much simpler than flash welders and should be cheaper for the same capacity. The method appears to combine the advantages of both resistance and flash welding without the drawbacks of either.

FIGURE 3 is similar to FIGURE 1 except that the microswitch MS1, which in FIGURE 1 is sensitive to the position of the jaw 2, is made sensitive to the pressure exerted on the jaw 2 by the piston 6. A pressure transducer PT1 sensitive to the compression in the rod linking the piston 6 with the jaw 2 is connected to a pressure transducer switching amplifier PA1 which operates the microswitch MS1, controlling the solenoid to release the pressure in chamber 7b and increase the forging pressure when the piston 6 starts to move.

FIGURE 4 is again similar, except that some form of temperature transducer T1 is made sensitive to the temperature of the workpieces. Upon reaching a forging temperature, a signal is emitted and amplified by a switching amplifier TA1 to operate the microswitch MS1.

FIGURE 5 shows a modification to the exhaust passage from the chamber 7b, controlled by solenoid 4. The passage is divided into parallel passages 16 and 17 which have valves therein to control slow and rapid exhausting respectively. The valves are controlled by an electronic amplifier FL for selecting opening to provide an initially slow movement and a subsequent more rapid movement of the piston 6. While slow unit control of microswitch MS1 as in FIGURE 1, this arrangement can clearly be used with an arrangement as in FIGURE 3 or FIGURE 4.

FIGURE 6 illustrates diagrammatically the concept of providing one or more of a pressure transducer PT (FIGURE 3), a displacement transducer DT (limit switch FIGURE 1) and a temperautre transducer TT (FIGURE 4), possibly in conjunction with a timer unit to control a pressure control unit (solenoids 11, 12, 13 and 14) for a firm unit (piston cylinder unit 6 or 7), in conjunction with the welding current duration, by means of a suitable programming unit, which incorporates a timer unit in addition to the switch for controlling the pressure control unit. The cycle of the welding current may thus be partly controlled by the welding condition, in that welding current may be continued for a given period after softening is detected by the transducer.

Various modifications may be made within the scope of the invention, which can also be usefully applied to the welding of stranded wire and wire rope as well as to materials of other shapes and constructions, and not only to circular wire and rod. Also this particular welding current circuit does not form part of this invention which could be applied particularly for larger welders, with circuits wherein the construction is relay operated.

I claim:

1. A process for resistance butt welding of wire rod workpieces comprising the steps of butting the ends of the workpieces, applying contact pressure therebetween just sufficient to maintain electrical contact, passing a welding current through the butted workpieces to heat the butted ends to a forging temperature, applying a first pressure between the butted ends of the workpieces after achievement of the forging temperature to provide relatively slow initial forging movement, and thereafter applying a second pressure between the butted ends of the workpieces to provide a more rapid subsequent forging movement.

2. A process as claimed in claim 1, including the step of cutting off the welding current in response to a timing device initiated after the achievement of forging temperature.

3. A process as claimed in claim 1, wherein the welding current is cut off by a timing device having its cycle initiated at the commencement of the more rapid movement.

4. Apparatus for resistance butt welding of wire rod workpieces comprising, in combination, means for supporting the workpieces in butted end-to-end relationship, means for applying a minimum pressure between the workpieces sufficient to maintain electrical contact, means for passing welding current through the butted ends of the workpieces, means for varying the pressure applied between the workpieces, and means comprising a temperautre transducer for retecting the achievement of forging temperature and actuating the means for varying the pressure applied, said pressure applying means including means for applying forging pressure at two levels to provide an initially slow forging movement followed by a more rapid forging movement.

5. Apparatus as claimed in claim 4, wherein the supporting means includes a fixed jaw for mounting one workpiece and a movable jaw for mounting the other workpiece for movement toward and away from the said one workpiece, a double acting piston cylinder unit including a pair of opposed chambers and comprising a movable member carrying the movable jaw, the pressure applying means including means for pressurizing the chambers with differential pressure to apply a constant pressure, the pressure varying means comprising means for exhausting one of the chambers.

6. Apparatus as claimed in claim 5, and including wherein the said one chamber has an exhaust passage, throttling means in the passage to limit the rate of exhausting to provide a slow forging movement, and means for unthrottling said passage to provide a more rapid forging movement.

7. Apparatus as claimed in claim 4, including a timer for controlling the duration of the welding current, and means for actuating the said timer at the change of pressure following the achievement of forging temperature.

8. Apparatus as claimed in claim 4, including a timer for controlling the duration of the welding current, and means for actuating the timer at the end of the relatively slow forging movement.

References Cited

UNITED STATES PATENTS

| | | | |
|---|---|---|---|
| 1,320,897 | 11/1919 | Murray et al. | 219—101 |
| 1,931,255 | 10/1933 | Frantz | 219—101 |
| 2,219,279 | 10/1940 | Gaspar | 219—57 X |
| 2,277,848 | 3/1942 | Delano | 219—57 |
| 2,403,229 | 7/1946 | Murray et al. | 219—101 X |
| 2,415,987 | 2/1947 | Bissout et al. | 219—101 |
| 2,731,534 | 1/1956 | Hansen et al. | 219—89 |
| 2,892,914 | 6/1959 | Rudd | 219—101 X |

JOSEPH V. TRUHE, Primary Examiner

B. A. STEIN, Assistant Examiner

U.S. Cl. X.R.

219—104